United States Patent
Kras et al.

(10) Patent No.: US 11,503,067 B2
(45) Date of Patent: Nov. 15, 2022

(54) SYSTEMS AND METHODS FOR DETERMINATION OF LEVEL OF SECURITY TO APPLY TO A GROUP BEFORE DISPLAY OF USER DATA

(71) Applicant: KnowBe4, Inc., Clearwater, FL (US)

(72) Inventors: Greg Kras, Dunedin, FL (US); Chris Cline, St. Petersburg, FL (US)

(73) Assignee: KnowBe4, Inc., Clearwater, FL (US)

( * ) Notice: Subject to any disclaimer, the term of this patent is extended or adjusted under 35 U.S.C. 154(b) by 0 days.

(21) Appl. No.: 17/697,882

(22) Filed: Mar. 17, 2022

(65) Prior Publication Data
US 2022/0210182 A1  Jun. 30, 2022

Related U.S. Application Data

(63) Continuation of application No. 17/513,072, filed on Oct. 28, 2021, now Pat. No. 11,297,095.

(60) Provisional application No. 63/107,625, filed on Oct. 30, 2020.

(51) Int. Cl.
*H04L 9/40* (2022.01)

(52) U.S. Cl.
CPC ...... *H04L 63/1433* (2013.01); *H04L 63/1483* (2013.01)

(58) Field of Classification Search
CPC .................. H04L 63/1433; H04L 63/1483
See application file for complete search history.

(56) References Cited

U.S. PATENT DOCUMENTS

| | | |
|---|---|---|
| 8,478,824 B2 | 7/2013 | Peled et al. |
| 8,615,807 B1 | 12/2013 | Higbee et al. |
| 8,635,703 B1 | 1/2014 | Belani et al. |
| 8,719,940 B1 | 5/2014 | Higbee et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |

(Continued)

FOREIGN PATENT DOCUMENTS

| | | |
|---|---|---|
| EP | 3 582 468 A1 | 12/2019 |
| WO | WO-2016/164844 A1 | 10/2016 |

OTHER PUBLICATIONS

International Search Report and Written Opinion on PCT PCT/US2021/057076 dated Feb. 1, 2022.

*Primary Examiner* — Sarah Su
(74) *Attorney, Agent, or Firm* — Foley & Lardner

(57) ABSTRACT

Systems and methods are described for using secured groups for simulated phishing campaigns to obfuscate data for levels of privacy based on protected criteria classes. Initially, a group to resolve members of the group based on multiple users matching one or more group criteria is established. It is then determined that at least one criteria of the one or more criteria has been configured as one of multiple protected criteria classes. Responsive to the determination, the group is identified as a secured group. A query of the group is then executed to identify one or more users of the multiple users as members of the group based on the users matching the criteria of the secured group at the time of execution of the group and information of the one or more users resulting from the execution of the secured group is obfuscated in accordance with the protected criteria class.

20 Claims, 8 Drawing Sheets

(56) References Cited

U.S. PATENT DOCUMENTS

| | | |
|---|---|---|
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,398,038 B2 | 7/2016 | Higbee et al. |
| 9,591,017 B1 | 3/2017 | Higbee et al. |
| 9,667,645 B1 | 5/2017 | Belani et al. |
| 9,679,048 B2 | 6/2017 | Chudnovskiy |
| 9,703,965 B1 | 7/2017 | Robinson et al. |
| 9,749,360 B1 | 8/2017 | Irimie et al. |
| 9,876,753 B1 | 1/2018 | Hawthorn |
| 9,912,687 B1 | 3/2018 | Wescoe et al. |
| 10,097,663 B1* | 10/2018 | Ferenczi ............... H04L 63/102 |
| 10,243,904 B1 | 3/2019 | Wescoe et al. |
| 10,375,572 B2* | 8/2019 | Achim ................ H04L 63/1425 |
| 10,757,139 B1* | 8/2020 | Cignetti .............. H04L 63/1433 |
| 10,904,186 B1 | 1/2021 | Everton et al. |
| 10,917,429 B1* | 2/2021 | Patton ................. H04L 63/1483 |
| 10,949,541 B1* | 3/2021 | Joshi .................. H04L 63/1425 |
| 10,986,122 B2 | 4/2021 | Bloxham et al. |
| 11,038,914 B1* | 6/2021 | Patton ................. H04L 63/1433 |
| 11,044,267 B2 | 6/2021 | Jakobsson et al. |
| 11,184,393 B1 | 11/2021 | Gendre et al. |
| 11,297,095 B1* | 4/2022 | Kras .................... G06F 21/6245 |
| 2005/0132042 A1 | 6/2005 | Cryer |
| 2007/0256133 A1 | 11/2007 | Garbow et al. |
| 2007/0271361 A1* | 11/2007 | Abzarian ............ H04L 63/0227 |
| | | 709/223 |
| 2012/0210125 A1* | 8/2012 | Shigemoto .......... H04L 63/1408 |
| | | 713/161 |
| 2012/0324113 A1* | 12/2012 | Prince .................. H04L 67/568 |
| | | 709/226 |
| 2016/0164898 A1 | 6/2016 | Belani et al. |
| 2016/0301705 A1 | 10/2016 | Higbee et al. |
| 2018/0309764 A1 | 10/2018 | Kras et al. |
| 2019/0173819 A1 | 6/2019 | Wescoe et al. |
| 2019/0215335 A1 | 7/2019 | Benishti |
| 2019/0245885 A1 | 8/2019 | Starink et al. |
| 2019/0297110 A1 | 9/2019 | Kras et al. |
| 2020/0099716 A1* | 3/2020 | Sjouwerman .......... H04L 63/20 |
| 2020/0142937 A1 | 5/2020 | Berger et al. |
| 2020/0162475 A1 | 5/2020 | Kras et al. |
| 2020/0162510 A1* | 5/2020 | Irimie .................... H04L 51/18 |
| 2020/0177612 A1 | 6/2020 | Kras ................... H04L 63/1433 |
| 2020/0195664 A1* | 6/2020 | Castilho .............. H04L 63/1425 |
| 2020/0259792 A1 | 8/2020 | Devarajan et al. |
| 2021/0075827 A1 | 3/2021 | Grealish |
| 2021/0185075 A1 | 6/2021 | Adams |
| 2021/0194924 A1 | 6/2021 | Heinemeyer et al. |
| 2021/0407308 A1 | 12/2021 | Brubaker et al. |
| 2021/0409418 A1 | 12/2021 | Kras et al. |
| 2022/0005373 A1 | 1/2022 | Nelson et al. |
| 2022/0006830 A1 | 1/2022 | Wescoe |

\* cited by examiner

Group Criteria [Group Criteria ▼]

Training: User must not have completed in Compliance Series PCI DSS for Merchants  541 users ← 302

User Field: The group name must be equal to Management  23 users

[Cancel] [Save]

Users

↕ Download CSV    Search by email or name...

Status: Active ▼  Type: All ▼  Groups: All ▼      ← 304

| ▲User | ▲PPP | ▲Risk | Groups | ▲Joined on | ▲Added on ⓘ | Actions |
|---|---|---|---|---|---|---|
| ☐ John.Doe@xyce.com<br>John Doe | 75 % | 10.3 | xyce.com,<br>Management, SG<br>Management Untrained | 03/14/2020 | 09/14/2020 | ▶ |
| ☐ Jane.Doe@xyce.com<br>Jane Doe | 75 % | 10.3 | xyce.com,<br>Management, SG<br>Management Untrained | 03/14/2020 | 09/14/2020 | ▶ |

FIG. 3

Group Criteria

Group Criteria ▼

User Field   The first name must be equal to John   [0 users] ← 402

Phish Event   User must have clicked on a phishing email once in the last 6 months   [0 users]

[Cancel]  [Save]

Users

Status: Active ▼  Type: All ▼  Groups: All ▼    ⬇ Download CSV

☐  ▲User   ▲PPP  ▲Risk   Groups   ▲Joined on   ▲Added on ⑦   Actions

┌─────────────────────────────────────────────────────────────┐
│ No users matched your criteria search. Please search by your user's name or email and try again. │  ← 404
└─────────────────────────────────────────────────────────────┘

Displaying 0 items

FIG. 4

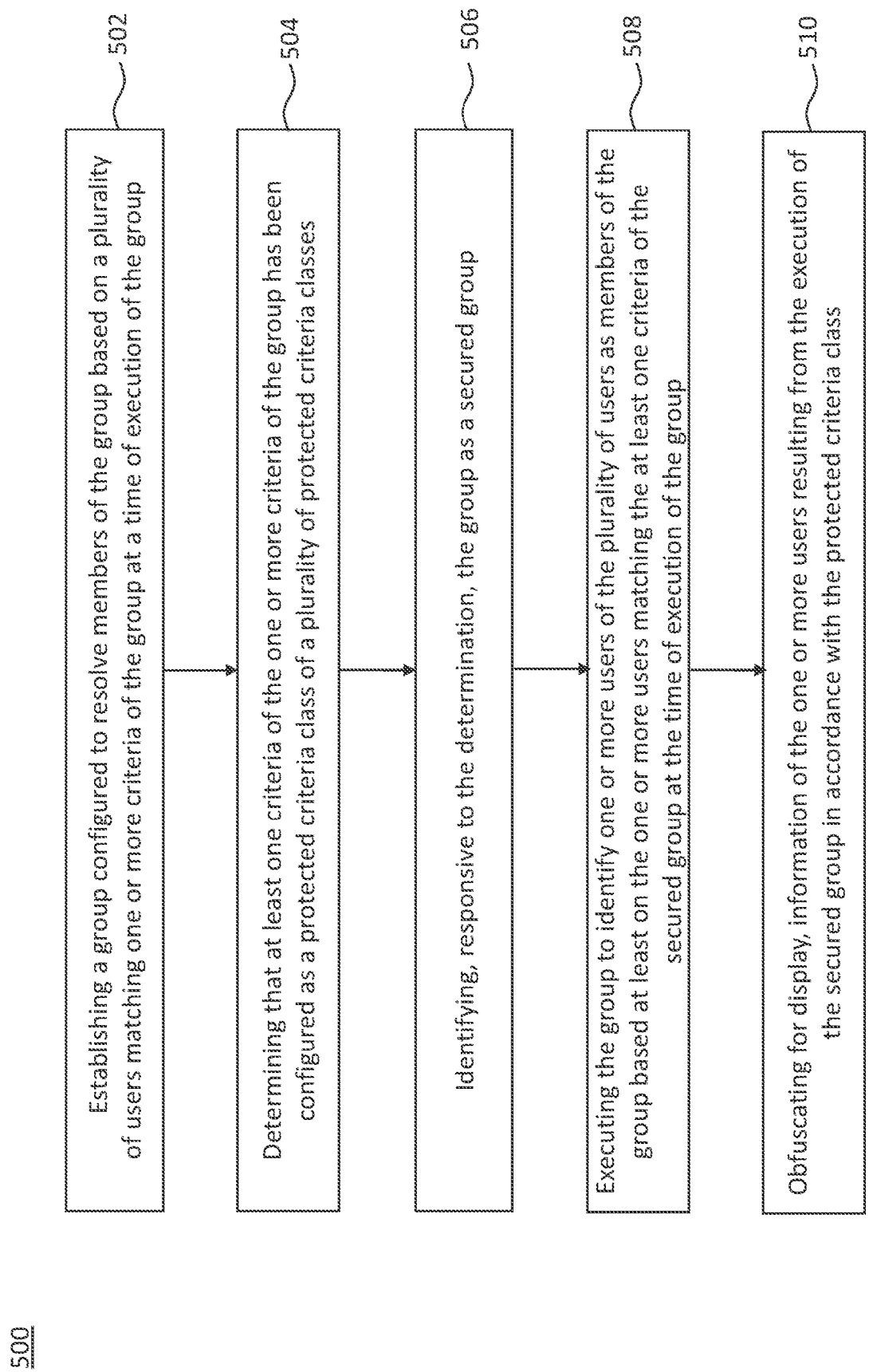

SYSTEMS AND METHODS FOR DETERMINATION OF LEVEL OF SECURITY TO APPLY TO A GROUP BEFORE DISPLAY OF USER DATA

RELATED APPLICATIONS

This patent application is a continuation of, and claims priority to and the benefit of U.S. patent application Ser. No. 17/513,072, titled "SYSTEMS AND METHODS FOR DETERMINATION OF LEVEL OF SECURITY TO APPLY TO A GROUP BEFORE DISPLAY OF USER DATA," and filed Oct. 28, 2021, which claims the benefit of and priority to U.S. Provisional Patent Application No. 63/107,625 titled "SYSTEMS AND METHODS FOR DETERMINATION OF LEVEL OF SECURITY TO APPLY TO A GROUP BEFORE DISPLAY OF USER DATA," and filed Oct. 30, 2020, the contents of all of which are hereby incorporated herein by reference in its entirety for all purposes

TECHNICAL FIELD

The present disclosure relates to systems and methods for determination of a level of security to apply to a group of users before display of user data.

BACKGROUND

To prevent or to reduce the success rate of malicious attacks, such as malicious phishing attacks on employees, organizations may conduct security awareness training programs for their employees, along with other security measures. Through security awareness training programs, organizations actively educate their employees on how to spot and report a suspected phishing attack. As a part of a security awareness training program, an organization may execute a simulated phishing campaign for its employees to test and improve security awareness of the employees. The simulated phishing campaign may include one or more simulated phishing communications. The simulated phishing campaign may also be referred to as simulated phishing attack. A simulated phishing communication may mimic a real phishing message and appear genuine to entice an employee to respond/interact with the simulated phishing communication. The organization may use one or more strategies to execute the simulated phishing campaign and/or the security awareness trainings to ensure all the employees of the organization are trained. For example, the organization may create one or more groups of employees that meet specified criteria. The criteria may include job role, location, department, training status, phishing failures, assessment scores, and any other attribute associated with the employees. For example, different groups may be created for employees at an accounting department, for employees at a legal department, for employees at an engineering department, and for employees at any other department of the organization. The groups may automate employee management for the purposes of determining the enrollment of employees in simulated phishing campaigns and/or security awareness training. For example, the groups may be used to organize simulated phishing campaigns, remedial trainings, security awareness reporting and other security awareness interactions with employees.

SUMMARY

The present disclosure generally relates to systems and methods for determination of a level of security to apply to a group of users before display of user data.

Systems and methods are provided for using secured groups for simulated phishing campaigns to obfuscate data for levels of security, access and/or privacy based on protected criteria classes. In an example embodiment, a method of using secured groups for simulated phishing campaigns to obfuscate data for levels of security, access and/or privacy based on protected criteria classes is described, which includes establishing a group configured to resolve members of the group based on a plurality of users matching one or more criteria of the group at a time of execution of the group, determining that at least one criteria of the one or more criteria of the group has been configured as a protected criteria class of a plurality of protected criteria classes, identifying the group as a secured group, executing the group to identify one or more users of the plurality of users as members of the group based on the one or more users matching the criteria of the secured group at the time of execution of the group, and obfuscating for display, information of the one or more users resulting from the execution of the secured group in accordance with the protected criteria class.

In some implementations, each of the plurality of protected criteria classes specifies how much of the information of the one or more users that meet the criteria of the protected criteria class, to obfuscate for display.

In some implementations, at least one protected criteria class of the plurality of protected criteria classes is dependent on an outcome of a query of the plurality of users matching the criteria of the secured group.

In some implementations, at least one protected criteria class of the plurality of protected criteria classes specifies that if a specified user meets the criteria then all of the users meeting the criteria are to have at least a portion of their information obfuscated for display. In some implementations, at least one protected criteria class of the plurality of protected criteria classes specifies that if any one user meets the criteria then all of the users meeting the criteria are to have at least a portion of their information obfuscated for display.

In some implementations, at least one protected criteria class of the plurality of protected criteria classes specifies that only the users meeting the criteria are to have their information obfuscated for display.

In some implementations, the method includes determining that a combination of the criteria forming a query statement for the secured group require at least a portion of data from results of the query are to be obfuscated for display.

In some implementations, the method includes determining that at least a portion of user data resulting from a query of the secured group are to be obfuscated for display.

In some implementations, the method includes obfuscating identifying information of the one or more users meeting the criteria of a protected criteria class of a secured group at the time of executing the secured group.

In some implementations, the method includes obfuscating metadata of the one or more users meeting the criteria of a protected criteria class of a secured group at the time of executing the secured group.

In some implementations, the method includes receiving an indication to configure at least one criteria as protected.

In another example implementation, a system of using secured groups for simulated phishing campaigns to obfuscate data for levels of security, access and/or privacy based on protected criteria classes is described. The system establishes a group configured to resolve members of the group based on a plurality of users matching one or more criteria of the group at a time of execution of the group. The system further determines that at least one criteria of the one or more criteria of the group has been configured as a protected criteria class of a plurality of protected criteria classes and identifies the group as a secured group in response to the determination. The system may execute the group to identify one or more users of the plurality of users as members of the group based on the one or more users matching the criteria of the secured group at the time of execution of the group and may obfuscate for display information of the one or more users resulting from the execution of the secured group in accordance with the protected criteria class.

Other aspects and advantages of the present solution will become apparent from the following detailed description, taken in conjunction with the accompanying drawings, which illustrate by way of example the principles of the present solution.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3 depicts an exemplary graphical user interface that a system administrator sees after querying users in a secured group, according to some embodiments;

FIG. 4 depicts another exemplary graphical user interface that the system administrator sees after querying users in a secured group, according to some embodiments;

FIG. 5 depicts a flowchart for using secured groups for simulated phishing campaigns to obfuscate user data for levels of security, access and/or privacy based on protected criteria classes, according to some embodiments.

DETAILED DESCRIPTION

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for determination of a level of security to apply to a group of users before display of user data.

A. Computing and Network Environment

Figure 1A:
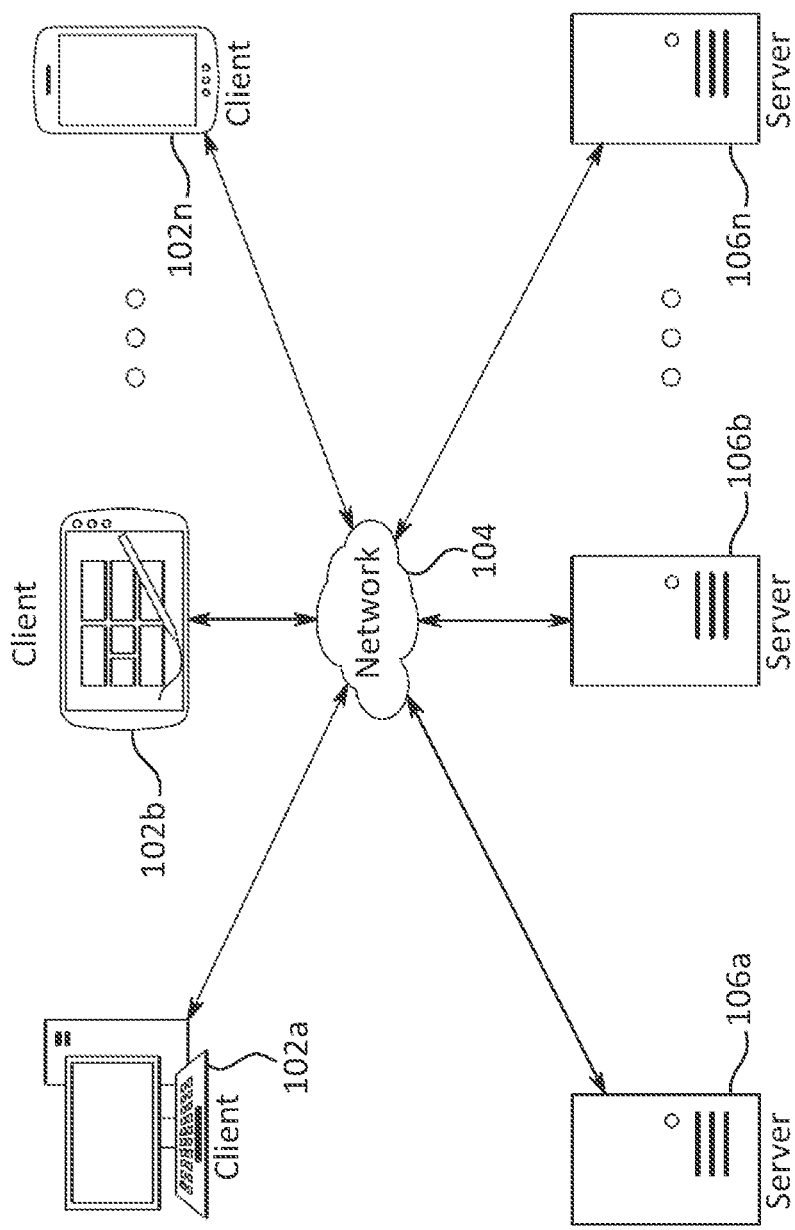
FIG. 1A is a block diagram depicting an embodiment of a network environment comprising client devices in communication with server devices, according to some embodiments.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, client 102 has the capacity to function as both a client node seeking access to resources provided by a server and as a server providing access to hosted resources for other clients 102a-102n.

Although FIG. 1A shows a network 104 between clients 102 and the servers 106, clients 102 and servers 106 may be on the same network 104. In some embodiments, there are multiple networks 104 between clients 102 and servers 106. In one of these embodiments, network 104' (not shown) may be a private network and a network 104 may be a public network. In another of these embodiments, network 104 may be a private network and a network 104' may be a public network. In still another of these embodiments, networks 104 and 104' may both be private networks.

Network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

Network 104 may be any type and/or form of network. The geographical scope of the network may vary widely and network 104 can be a body area network (BAN), a personal area network (PAN), a local-area network (LAN), e.g. Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104'. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. Network 104 may be a type of broadcast network, a telecommunications network, a data communication network, or a computer network.

In some embodiments, the system may include multiple, logically grouped servers 106. In one of these embodiments, the logical group of servers may be referred to as a server farm or a machine farm. In another of these embodiments, servers 106 may be geographically dispersed. In other embodiments, a machine farm may be administered as a single entity. In still other embodiments, the machine farm includes a plurality of machine farms. Servers 106 within each machine farm can be heterogeneous—one or more of servers 106 or machines 106 can operate according to one type of operating system platform (e.g., Windows, manufactured by Microsoft Corp. of Redmond, Wash.), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In the embodiment, consolidating servers 106 in this way may improve system manageability, data security, the physical security of the system, and system performance by locating servers 106 and high-performance storage systems on localized high-performance networks. Centralizing servers 106 and storage systems and coupling them with advanced system management tools allows more efficient use of server resources.

Servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if servers 106 are connected using a local-area network (LAN) connection or some form of direct connection. In some embodiments, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, Calif. Additional layers of abstraction may include Container Virtualization and Management infrastructure. Container Virtualization isolates execution of a service to the container while relaying instructions to the machine through one operating system layer per host machine. Container infrastructure may include Docker, an open source product whose development is overseen by Docker, Inc. of San Francisco, Calif.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
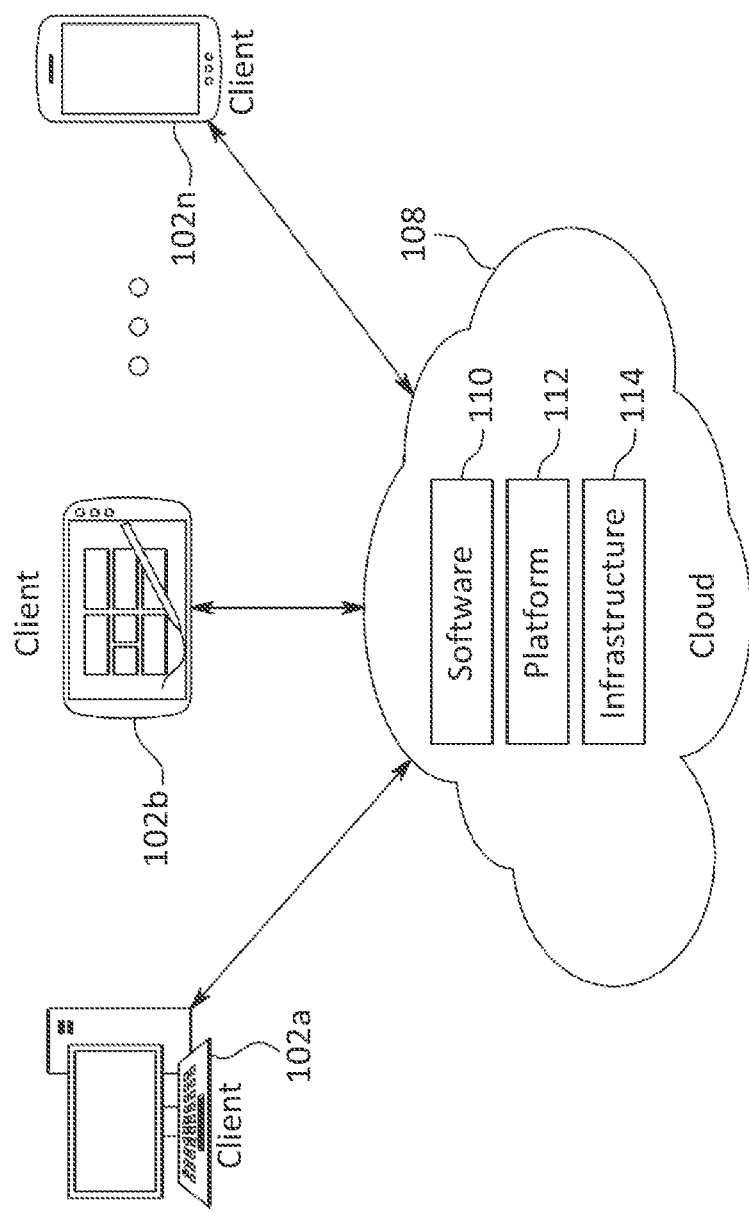
FIG. 1B is a block diagram depicting a cloud computing environment comprising client devices in communication with cloud service providers, according to some embodiments.

Referring to FIG. 1B, a cloud computing environment is depicted. A cloud computing environment may provide client 102 with one or more resources provided by a network environment. The cloud computing environment may include one or more clients 102a-102n, in communication with cloud 108 over one or more networks 104. Clients 102 may include, e.g., thick clients, thin clients, and zero clients. A thick client may provide at least some functionality even when disconnected from cloud 108 or servers 106. A thin client or zero client may depend on the connection to cloud 108 or server 106 to provide functionality. A zero client may depend on cloud 108 or other networks 104 or servers 106 to retrieve operating system data for the client device 102. Cloud 108 may include back end platforms, e.g., servers 106, storage, server farms or data centers.

Cloud 108 may be public, private, or hybrid. Public clouds may include public servers 106 that are maintained by third parties to clients 102 or the owners of the clients. Servers 106 may be located off-site in remote geographical locations as disclosed above or otherwise. Public clouds may be connected to servers 106 over a public network. Private clouds may include private servers 106 that are physically maintained by clients 102 or owners of clients. Private clouds may be connected to servers 106 over a private network 104. Hybrid clouds may include both the private and public networks 104 and servers 106.

Cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Wash., Rackspace Cloud provided by Rackspace Inc. of San Antonio, Tex., Google Compute Engine provided by Google Inc. of Mountain View, Calif., or RightScale provided by RightScale, Inc. of Santa Barbara, Calif. PaaS providers may offer functionality provided by IaaS, including, e.g., storage, networking, servers, virtualization or containerization, as well as additional resources, e.g., the operating system, middleware, or runtime resources. Examples of PaaS include Windows Azure provided by Microsoft Corporation of Redmond, Wash., Google App Engine provided by Google Inc., and Heroku provided by Heroku, Inc. of San Francisco Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, Calif., or Office365 provided by Microsoft Corporation. Examples of SaaS may also include storage providers, e.g. Dropbox provided by Dropbox Inc. of San Francisco, Calif., Microsoft OneDrive provided by Microsoft Corporation, Google Drive provided by Google Inc., or Apple iCloud provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over a Hypertext Transfer Protocol (HTTP) and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g. Google Chrome, Microsoft Internet Explorer, or Mozilla Firefox provided by Mozilla Foundation of Mountain View, Calif.). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client 102 and server 106 may be deployed as and/or executed on any type and form of computing device, e.g., a computer, network device or appliance capable of communicating on any type and form of network and performing the operations described herein.

Figure 1C:
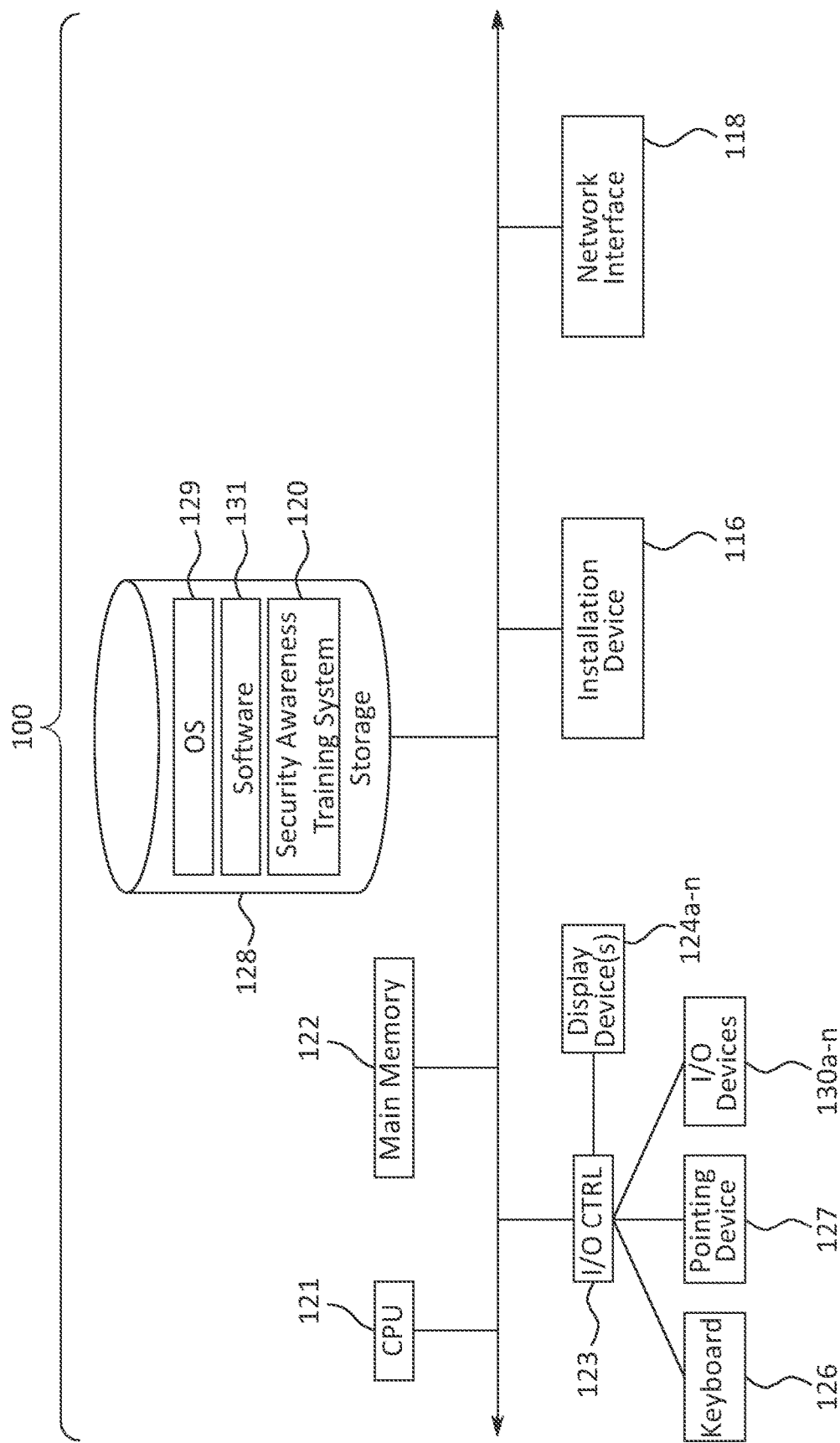
FIGS. 1C and 1D are block diagrams depicting embodiment/s of computing devices useful in connection with the methods and systems described herein, according to some embodiments.
Figure 1D:
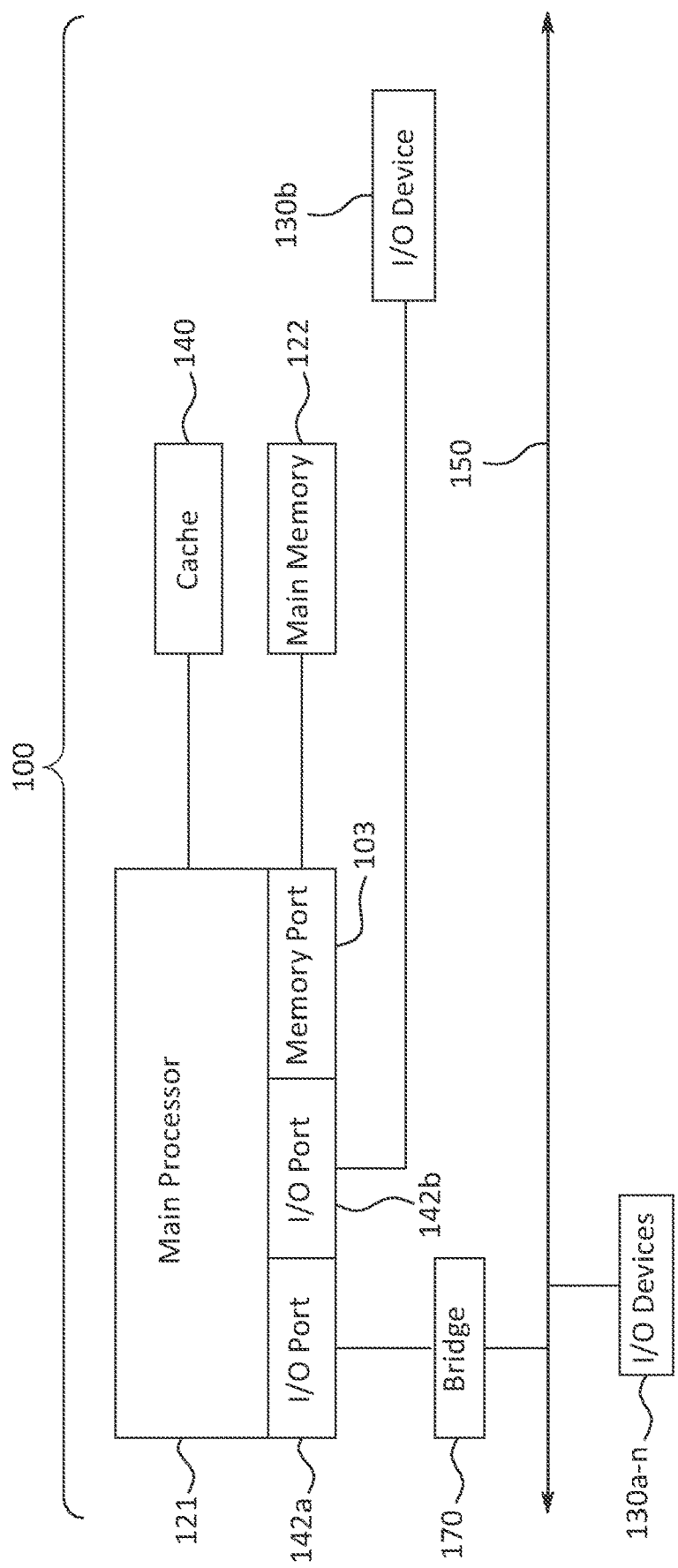

FIGS. 1C and 1D depict block diagrams of a computing device 100 useful for practicing an embodiment of client 102 or server 106. As shown in FIGS. 1C and 1D, each computing device 100 includes central processing unit 121, and main memory unit 122. As shown in FIG. 1C, computing device 100 may include storage device 128, installation device 116, network interface 118, and I/O controller 123, display devices 124a-124n, keyboard 126 and pointing device 127, e.g., a mouse. Storage device 128 may include, without limitation, operating system 129, software 131, and a software of security awareness training system 120. As shown in FIG. 1D, each computing device 100 may also include additional optional elements, e.g., a memory port 103, bridge 170, one or more input/output devices 130a-130n (generally referred to using reference numeral 130), and cache memory 140 in communication with central processing unit 121.

Central processing unit 121 is any logic circuitry that responds to and processes instructions fetched from main memory unit 122. In many embodiments, central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. Computing device 100 may be based on any of these processors, or any other processor capable of operating as described herein. Central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i7.

Main memory unit 122 may include one or more memory chips capable of storing data and allowing any storage location to be directly accessed by microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, main memory 122 or storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. Main memory 122 may be based on any of the above described memory chips, or any other available memory chips capable of operating as described herein. In the embodiment shown in FIG. 1C, the processor 121 communicates with main memory 122 via system bus 150 (described in more detail below). FIG. 1D depicts an embodiment of computing device 100 in which the processor communicates directly with main memory 122 via memory port 103. For example, in FIG. 1D main memory 122 may be DRDRAM.

FIG. 1D depicts an embodiment in which the main processor 121 communicates directly with cache memory 140 via a secondary bus, sometimes referred to as a backside bus. In other embodiments, main processor 121 communicates with cache memory 140 using system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via local system bus 150. Various buses may be used to connect central processing unit 121 to any of I/O devices 130, including a PCI bus, a PCI-X bus, or a PCI-Express bus, or a NuBus. For embodiments in which the I/O device is video display 124, the processor 121 may use an Advanced Graphic Port (AGP) to communicate with display 124 or the I/O controller 123 for display 124. FIG. 1D depicts an embodiment of computer 100 in which main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by I/O controller 123 as shown in FIG. 1C. The I/O controller may control one or more I/O devices, such as, e.g., keyboard 126 and pointing device 127, e.g., a mouse or optical pen. Furthermore, an I/O device may also provide storage and/or installation medium 116 for computing device 100. In still other embodiments, computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, computing device 100 may include or connect to multiple display devices 124a-124n, which each may be of the same or different type and/or form. As such, any of I/O devices 130a-130n and/or the I/O controller 123 may include any type and/or form of suitable hardware, software, or combination of hardware and software to support, enable or provide for the connection and use of multiple display devices 124a-124n by computing device 100. For example, computing device 100 may include any type and/or form of video adapter, video card, driver, and/or library to interface, communicate, connect or otherwise use display devices 124a-124n. In one embodiment, a video adapter may include multiple connectors to interface to multiple display devices 124a-124n. In other embodiments, computing device 100 may include multiple video adapters, with each video adapter connected to one or more of display devices 124a-124n. In some embodiments, any portion of the operating system of computing device 100 may be configured for using multiple displays 124a-124n. In other embodiments, one or more of the display devices 124a-124n may be provided by one or more other computing devices 100a or 100b connected to computing device 100, via network 104. In some embodiments, software may be designed and constructed to use another computer's display device as second display device 124a for computing device 100. For example, in one embodiment, an Apple iPad may connect to computing device 100 and use the display of the device 100 as an additional display screen that may be used as an extended desktop. One ordinarily skilled in the art will recognize and appreciate the various ways and embodiments that computing device 100 may be configured to have multiple display devices 124a-124n.

Referring again to FIG. 1C, computing device 100 may comprise storage device 128 (e.g. one or more hard disk drives or redundant arrays of independent disks) for storing an operating system or other related software, and for storing application software programs such as any program related to security awareness training system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to computing device 100 via bus 150. Some storage device 128 may be external and connect to computing device 100 via a I/O device 130 that provides an external bus. Some storage device 128 may connect to computing device 100 via network interface 118 over network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. In some embodiments, the operating system and the software can be run from a bootable medium, for example, a bootable CD, e.g. KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on client device 102. An application distribution platform may include a repository of applications on server 106 or cloud 108, which clients 102a-102n may access over a network 104. An application distribution platform may include application developed and provided by various developers. A user of client device 102 may select, purchase and/or download an application via the application distribution platform.

Furthermore, computing device 100 may include a network interface 118 to interface to network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. Network interface 118 may comprise a built-in network adapter, network interface card, PCMCIA network card, EXPRESSCARD network card, card bus network adapter, wireless network adapter, USB network adapter, modem or any other device suitable for interfacing computing device 100 to any type of network capable of communication and performing the operations described herein.

Computing device 100 of the sort depicted in FIGS. 1B and 1C may operate under the control of an operating system, which controls scheduling of tasks and access to system resources. Computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

Computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. Computer system 100 has sufficient processor power and memory capacity to perform the operations described herein. In some embodiments, computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, computing device 100 is a gaming system. For example, the computer system 100 may comprise a PLAYSTATION 3, or PERSONAL PLAYSTATION PORTABLE (PSP), PLAYSTATION VITA, PLAYSTATION 4, or a PLAYSTATION 4 PRO device manufactured by the Sony Corporation of Tokyo, Japan, or a NINTENDO DS, NINTENDO 3DS, NINTENDO WII, NINTENDO WII U, or a NINTENDO SWITCH device manufactured by Nintendo Co., Ltd., of Kyoto, Japan, or an XBOX 360 device manufactured by Microsoft Corporation.

In some embodiments, computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, computing device 100 is a tablet e.g. the IPAD line of devices by Apple; GALAXY TAB family of devices by Samsung; or KINDLE FIRE, by Amazon.com, Inc. of Seattle, Wash. In other embodiments, computing device 100 is an eBook reader, e.g. the KINDLE family of devices by Amazon.com, or NOOK family of devices by Barnes & Noble, Inc. of New York City, N.Y.

In some embodiments, communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, communications device 102 is a laptop or desktop computer equipped with a web browser and a microphone and speaker system, e.g. a telephony headset. In these embodiments, communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, the information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Determination of Level of Security to Apply to Users of a Group Before Display of User Data The following describes systems and methods for determination of a level of security to apply to users of a group before display of user data.

An organization may organize simulated phishing campaigns to test and educate employees (also referred to as 'users') on phishing threats and ways to deal with phishing attacks. The organization may create one or more groups of users based on one or more criteria and may use these groups when planning simulated phishing campaigns. The criteria for users that is used to create groups may include job role, location, department, training status, phishing failures, assessment scores, and any other attribute associated with the employees. The criteria used to establish the groups may be based on user actions and user characteristics and may be applied to any set or subset of users of the organization. Groups may help the organization deliver simulated phishing campaigns and security awareness training targeted to specific users based on the specific users' information matching the criteria of the groups. In an example, users may be added to a specific group depending on one or more interactions of the users with a simulated phishing communication, such as clicking on a link or opening an attachment included in the simulated phishing communication. In another example, users who have yet to complete a security awareness training may be added to a specific group. To create simulated phishing campaigns and organize appropriate security awareness trainings for users who interact with those simulated phishing campaigns, may involve a system administrator. The system administrator may be a professional who has responsibility for managing organizational cybersecurity aspects. As a part of his or her job, the system administrator can query membership of any group, for example allowing the system administrator to see the membership of any group and identify the users in the group. However, when the system administrator runs a query, he or she may be presented with personally identifiable information of users that the system administrator may not be allowed to access according to security rules and/or access rules and requirements, such as certain data protection laws of some countries or policies of specific organizations.

To preserve anonymity of users in certain situations, many jurisdictions may have data protection laws and workplace regulations in force. These laws and regulations provide a legal framework on how to obtain, use, and store data of the users. For example, General Data Protection Regulation (GDPR) is in force in Europe and General Data Protection Law (Lei Geral de Proteção de Dados (LGPD)) is in force in Brazil. In an example, according to a data protection law, information of a user of an organization who has failed a simulated phishing attack or failed to complete remedial training may have to be obfuscated to ensure that the user is not subjected to unfair treatment by the system administrator and other users of the organization. To comply with data protection laws and workplace regulations, organizations may implement security and access controls to protect privacy of their users that require anonymization of the users and information associated with them. For example, organizations may need to protect information related to how the users perform during a simulated phishing campaign. However, when creating a query to establish a group, a system administrator may not have awareness as to which users will match the query and become members of the group, and whether certain users becoming members of the group impacts whether some or all users that are members of the group should have their personal information obscured. In some embodiments, completely obscuring group membership or anonymizing the identities of the users resulting from the query in order to comply with data protection laws may make it difficult for the system administrator to subsequently identify and provide training to users who need to receive remedial training, and still comply with certain data protection laws. Also, users of organizations may be based in different jurisdictions. In such circumstances, the organizations may find organizing simulated phishing campaigns and security awareness trainings for users in compliance with several data protection laws challenging.

The systems and methods of the present disclosure leverage a security awareness training system to determine a level of security to apply to one or more groups of users before display of user data. A user may be an individual who may have to be tested and/or trained by the security awareness training system. Further, the user may be an employee of an organization, a member of a group, or any individual that can receive an electronic message, or who may act in any capacity of the security awareness training system.

As a part of the security awareness training system, to organize and execute simulated phishing campaigns, remedial training, and other interactions with users, groups are formed. The groups can be based on, or formed from, any set of users, and may be determined based on user actions and characteristics meeting one or more criteria, and may enable the security awareness training system to deliver simulated phishing campaigns and training campaigns targeted to users who meet specified criteria.

In an example, these groups may be query based groups that accurately and automatically build a list of users that meet specified criteria at the moment that the group is executed, for example when the group is created, requested, or used. In an implementation, these groups may be inspected to determine which users met the specified criteria. Users may be dynamically added and removed from the groups based on these criteria when the groups are executed. Some of these criteria may lead to personally identifiable information of the users that is protected under data protection laws and company policy to be exposed if the user's data is displayed when the user meets the criteria.

In an implementation, the security awareness training system may automatically configure, or mark criteria as protected according to compliance with various government regulations (or data protection laws) and/or company policy. Marking a criteria as protected may indicate that identity of users that fit the criteria cannot be displayed without violating the regulations. In some examples, marking a criteria as protected indicate that some or all information associated with users that fit the criteria cannot be displayed without violating the regulations. In some implementations, groups (also referred to as smart groups when the groups are created according to membership criteria) with any of protected criteria may automatically be converted into secured groups with user anonymity enabled. In an example, a secured group involves partial or full obfuscation of user data of a smart group, thus allowing the system administrator to create intelligent workflows involving simulated phishing campaigns delivered to users and training the users who fail the phishing campaigns while staying in accordance with anonymity requirements while at the same time, protecting the security of the users personal information. In an implementation, security awareness training system may use artificial intelligence (AI) and/or machine learning (ML) techniques to determine which criteria need to be marked protected and to decide how much user data should be obfuscated while displaying the user data. Thus, the security awareness training system may allow automatic obfuscation of user data in compliance with data protection laws across several jurisdictions and company policies while still enabling the system administrator to create and run simulated phishing campaigns and training campaigns to a set of users that meet relevant criteria.

Figure 2:
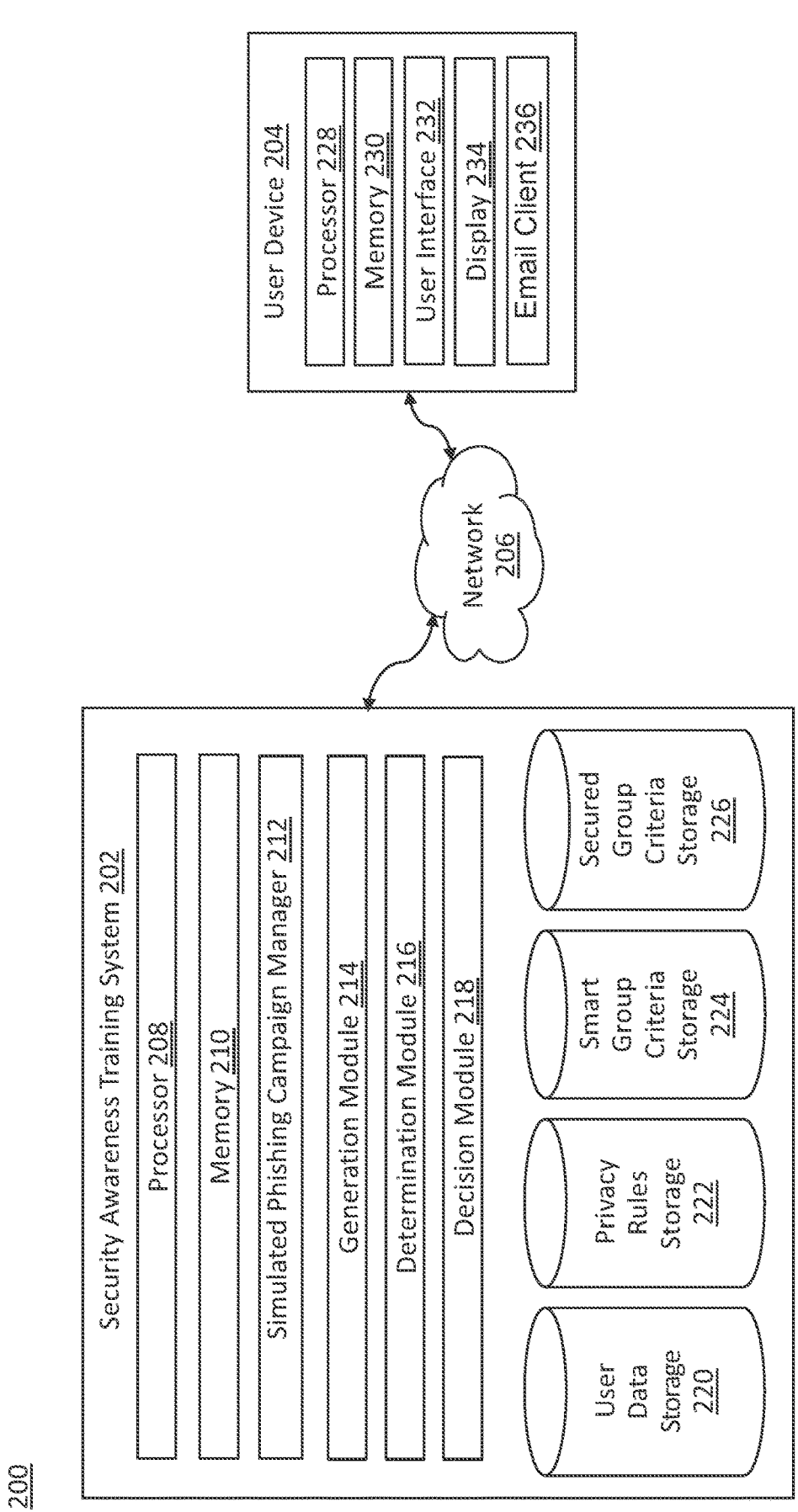
FIG. 2 depicts an implementation of some of an architecture of an implementation of a system for using secured groups for simulated phishing campaigns to obfuscate user data for levels of security, access and/or privacy based on protected criteria classes, according to some embodiments.

FIG. 2 depicts an implementation of some of an architecture of an implementation of system 200 for using secured groups for simulated phishing campaigns to obfuscate user data for levels of security, access and/or privacy based on protected criteria classes, according to some embodiments.

Secured groups may be used for the security of data of the user, including personal information of the user. Using secured groups for simulated phishing campaigns to obfuscate user data and controlling access privilege to user data and personal information improves the security of the user's data and personal information. The secured groups may provide different levels of access control and/or security to manage and/or control what portion of data may be accessed, viewed or displayed to whom.

System 200 may include security awareness training system 202, user device 204, and network 206 enabling communication between the system components for information exchange. Network 206 may be an example or instance of network 104, details of which are provided with reference to FIG. 1A and its accompanying description.

According to some embodiments, security awareness training system 202 may be implemented in a variety of computing systems, such as a mainframe computer, a server, a network server, a laptop computer, a desktop computer, a notebook, a workstation, and any other computing system. In an implementation, security awareness training system 202 may be implemented in a server, such as server 106 shown in FIG. 1A. In some implementations, security awareness training system 202 may be implemented by a device, such as computing device 100 shown in FIGS. 1C and 1D. In some embodiments, security awareness training system 202 may be implemented as a part of a cluster of servers. In some embodiments, security awareness training system 202 may be implemented across a plurality of servers, thereby, tasks performed by security awareness training system 202 may be performed by the plurality of servers. These tasks may be allocated among the cluster of servers by an application, a service, a daemon, a routine, or other executable logic for task allocation.

In one or more embodiments, security awareness training system 202 may facilitate cybersecurity awareness training, for example via simulated phishing campaigns and security training campaigns. The simulated phishing campaigns may also be interchangeably referred to as simulated phishing attacks. A simulated phishing campaign is a technique of testing a user to see whether the user is likely to recognize a true malicious phishing attack and act appropriately upon receiving the malicious phishing attack. In some embodiments, the user may be an employee of the organization, a customer, or a vendor, or anyone associated with the organization. In some embodiments, the user may be an end-customer/consumer or a patron using the goods and/or services of the organization. In an implementation, security awareness training system 202 may execute the simulated phishing campaign by sending out one or more simulated phishing communications periodically or occasionally to the users and observe responses of the users to such simulated phishing communications. A simulated phishing communication may mimic a real phishing message and appear genuine to entice a user to respond/interact with the simulated phishing communication. Further, a simulated phishing communication may include links, attachments, macros, or any other simulated phishing threat that resembles a real phishing threat. In response to a user interaction with the simulated phishing communication, for example if the user clicks on a link (i.e., a simulated phishing link), the user may be provided with security awareness training.

In some embodiments, security awareness training system 202 may provide security awareness training to users through one or more security training campaigns. In some examples, security awareness training system 202 may teach users various aspects of security awareness through quizzes, tests, training videos, assessments, text and image media, and any other method of training. In an example, security awareness training system 202 may provide security awareness training to users for advertisement-based threats, email-based threats, newsletter-based threats, and other phishing threats.

In some implementations, security awareness training system 202 may be owned or managed or otherwise associated with an organization or any entity authorized thereof. In an implementation, security awareness training system 202 may be managed by a system administrator. The system administrator may be a professional (or a team of professionals) managing organizational cybersecurity aspects. The system administrator may oversee and manage security awareness training system 202 to ensure cybersecurity goals of the organization are met. In an example, the system administrator may manage creation and configuration of simulated phishing campaigns, whitelisting and delivery verification campaigns, cybersecurity training campaigns, and any other element within security awareness training system 202. In an embodiment, the system administrator may be assigned administrator login credentials to access security awareness training system 202. In an example, security awareness training system 202 may be a Computer Based Security Awareness Training (CBSAT) system that performs security services such as performing simulated phishing attacks on a user or a set of users of an organization as a part of security awareness training.

In some implementations, security awareness training system 202 may use artificial intelligence (AI) and/or machine learning (ML) techniques to intuitively analyze security awareness requirements of a user based on risk scores, responses to simulated phishing communications, and tests associated with cybersecurity training. Based on the analysis, security awareness training system 202 may generate a simulated phishing campaign for the user or may provide cybersecurity awareness training to the user. Security awareness training system 202 may reduce work burden and support the system administrator in achieving the security goals of the organization.

According to some embodiments, security awareness training system 202 may include processor 208 and memory 210. For example, processor 208 and memory 210 of security awareness training system 202 may be CPU 121 and main memory 122 respectively as shown in FIGS. 1C and 1D. Further, security awareness training system 202 may include simulated phishing campaign manager 212. Simulated phishing campaign manager 212 may include various functionalities that may be associated with cybersecurity awareness training. In an implementation, simulated phishing campaign manager 212 may be an application or a program that manages various aspects of simulated phishing campaigns (or simulated phishing attacks). In an example, simulated phishing campaign manager 212 may manage tailoring and/or execution of a simulated phishing attack. Simulated phishing campaign manager 212 may also manage remedial trainings and other training campaigns. A simulated phishing attack may test the readiness of a user to handle phishing attacks such that malicious actions are prevented. For instance, simulated phishing campaign manager 212 may monitor and control timing of various aspects of a simulated phishing attack including processing requests for access to simulated phishing attack results, and performing other tasks related to the management of a simulated phishing attack. Simulated phishing campaigns may include of simulated phishing communications that include or mimic tricks that real phishing messages use, to try and teach users to recognize these. The more genuine a simulated phishing communication appears, the more likely a user will respond to it.

Further, security awareness training system 202 may include generation module 214, determination module 216, and decision module 218. In an implementation, generation module 214, determination module 216, and decision module 218 may be coupled to processor 208 and memory 210. In some embodiments, generation module 214, determination module 216, and decision module 218 amongst other modules, may include routines, programs, objects, components, data structures, etc., which may perform particular tasks or implement particular abstract data types. Generation module 214, determination module 216, and decision module 218 may also be implemented as, signal processor(s), state machine(s), logic circuitries, and/or any other device or component that manipulate signals based on operational instructions.

In some embodiments, generation module 214, determination module 216, and decision module 218 may be implemented in hardware, instructions executed by a processing unit, or by a combination thereof. The processing unit may comprise a computer, a processor, a state machine, a logic array or any other suitable devices capable of processing instructions. The processing unit may be a general-purpose processor which executes instructions to cause the general-purpose processor to perform the required tasks or the processing unit may be dedicated to performing the required functions. In some embodiments, generation module 214, determination module 216, and decision module 218 may be machine-readable instructions which, when executed by a processor/processing unit, perform any of desired functionalities. In some embodiments, generation module 214 may be otherwise known as a group executor or a group generator. The machine-readable instructions may be stored on an electronic memory device, hard disk, optical disk or other machine-readable storage medium or non-transitory medium. In an implementation, the machine-readable instructions may also be downloaded to the storage medium via a network connection. In an example, machine-readable instructions may be stored in memory 210.

In some embodiments, security awareness training system 202 may include user data storage 220, privacy rules storage 222, smart group criteria storage 224, and secured group criteria storage 226. In an implementation, user data storage 220 may store metadata relating to users. In some examples, user data storage 220 may store personal information of the users. In some implementations, user data storage 220 may also store information associated with actions performed by the users with respect to simulated phishing campaigns, training campaigns, remedial trainings, and other such campaigns and trainings. According to an implementation, privacy rules storage 222 may store one or more privacy rules regarding how the data or information in user data storage 220 is to be managed. The privacy rules may be implemented based on various government regulations (or data protection laws) across several jurisdictions, company policies, system administrator preferences, and user preferences that restrict access to user data. In an example, a privacy rule may specify particular information about users to be obfuscated. The privacy rules may be referred to as security rule and/or access control rules as such rules control who has access to what data.

In an implementation, smart group criteria storage 224 may store information related to one or more criteria to be applied to, or associated with, groups. Users may be dynamically added and removed from smart groups based on these criteria when a smart group is executed to identify one or more users matching the one or more criteria of the smart group. In an example, each of the one or more criteria may include a set of criterions. A criteria may include any attribute that could be applicable to a user. In other words, a criteria may be used as a basis for identifying users. Examples of the one or more criteria include, but are not limited to, user field criteria, user date criteria, phish event criteria, and training criteria. In an example, the user field criteria may be used to filter users based on attributes related to the users such as a first name, a last name, a location, a risk score, a phish prone percentage, or any other metadata. A phish prone percentage of a user is a metric scoring a number of simulated phishing attacks the user has failed, in some examples as a percentage of the total number of simulated phishing attacks the user has received, and a risk score of a user is a metric scoring security awareness risk the user poses to the organization. In an example, user date criteria may be used to filter users by user-specific dates such as dates when the users were added to security awareness training system 202, dates when the users joined the organization, dates when the users logged in to security awareness training system 202, or any other custom dates regarding or associated with the users.

Further, in an example, the phish event criteria may be used to filter users based on their actions related to simulated phishing campaigns or simulated phishing tests. For example, the phish event criteria may be used to filter users who have failed a simulated phishing test in one or more ways, users who have received a simulated phishing test and did not fail, and any other action related to simulated phishing campaigns or simulated phishing tests. In an example, the phish event criteria may be used to filter the users based on whether or not the users performed any type of interaction or a specific type of action with a simulated phishing communication, a severity of the interaction performed by the users, and/or a number of interactions of the users with the simulated phishing communication. In an example, training criteria may be used to filter users based on their involvement in training campaigns. For example, training criteria may include information such as whether users are enrolled in a training, whether the users have started the training, an amount of training the users have completed, whether or not the users have completed the training, whether or not the users interact with a simulated phishing communication when enrolled in a training, after starting the training, or after completing the training, a type of interaction that users have with the simulated phishing communication when enrolled in the training, after starting the training, or after completing the training, whether or not an assessment has been taken by the users, whether or not the users have scored within a certain threshold score on the assessment, whether or not certain assessment topics have been taken, or other any criteria associated with demographics, characteristics or behavior of the users with regard to security awareness. In some implementations, the one or more criteria may be stored in smart group criteria storage 224 and may be set, created, or defined by the system administrator, by cybersecurity experts of the organization, or by a personnel contracted by the organization. In an example, the one or more criteria may be learnt through results of simulated phishing campaigns and training campaigns. In some examples, the criteria could also be set by Artificial Intelligence (AI) techniques or Machine Leaning (ML) techniques.

In some embodiments, secured group criteria storage 226 may store information about a plurality of protected criteria classes. In an example, each of the plurality of protected criteria classes may specify if information of users is to be obfuscated for display and how much of the information of the users is to be obfuscated for display. In an example, the plurality of protected criteria classes may include Criteria Class A, Criteria Class B, Criteria Class C, and Criteria Class D. The Criteria Class D may further include Criteria Class D1 and Criteria Class D2.

In an example, Criteria Class A may be criteria that do not create a privacy rule violation. For example, users associated with criteria of Criteria Class A can be personally identified and information about the users can be displayed to anyone. In an example, Criteria Class B may be criteria that always create a privacy rule violation. For example, each user associated with criteria of Criteria Class B must have his or her personal identity protected to be compliant with privacy rules. In other words, information about the users associated criteria of Criteria Class B must always be obfuscated. In an example, Criteria Class C may include criteria that create a privacy rule violation if combined with other criteria. In an example, information about the users associated with criteria of Criteria Class C must be obfuscated if the users meet one or more additional criteria that create a privacy rule violation if combined. In a further example, Criteria Class D may include a criteria for which an obfuscation decision is dependent on an outcome of a query. In other words, Criteria Class D may include a criteria that examines user data of the users returned from the query to look for compliance with privacy rules. In an example, Criteria Class D1 specifies that that only users meeting the criteria of Criteria Class D1 are to have their information obfuscated for display. In an example, if an identifier for a criteria is X, where $1<X<=M$ and M is a total number of criteria, then if the criteria X when run on the entire user population U yields a user Y, where $1<Y<=N$ and N is the total number of users in the organization, then information of user Y must be obfuscated. Further, in an example, Criteria Class D2 specifies that if a specified user meets the criteria of Criteria Class D2, then all of the users meeting the criteria are to have at least a portion of their information obfuscated for display. Accordingly, each of the protected criteria classes provides a different level of privacy to the users. Information related to the users of the organization stored in user data storage 220, information stored in privacy rules storage 222, information related to the one or more criteria to be applied to, or associated with, groups stored in smart group criteria storage 224, and information related to the plurality of protected criteria classes stored in secured group criteria storage 226 may be periodically or dynamically updated as required.

Referring again to FIG. 2, in some embodiments, user device 204 may be any device used by a user. The user may be an employee of an organization or any entity. According to some embodiments, user device 204 may include processor 228 and memory 230. In an example, processor 228 and memory 230 of user device 204 may be CPU 121 and main memory 122, respectively, as shown in FIGS. 1C and 1D. User device 204 may also include user interface 232 such as a keyboard, a mouse, a touch screen, a haptic sensor, voice-based input unit, or any other appropriate user interface. It shall be appreciated that such components of user device 204 may correspond to similar components of computing device 100 in FIGS. 1C and 1D, such as keyboard 126, pointing device 127, I/O devices 130*a-n* and display devices 124*a-n*. User device 204 may also include display 234, such as a screen, a monitor connected to the device in any manner, or any other appropriate display. In an implementation, user device 204 may display received content (for example, simulated phishing communications) for the user using display 234 and is able to accept user interaction via user interface 232 responsive to the displayed content.

In some embodiments, user device 204 may include email client 236. In one example implementation, email client 236 may be an application installed on user device 204. In another example implementation, email client 236 may be an application that can be accessed over network 206 through a browser without requiring to be installed on user device 204. In an implementation, email client 236 may be any application capable of composing, sending, receiving, and reading email messages. For example, email client 236 may be an instance of an application, such as Microsoft Outlook™ application, IBM® Lotus Notes® application, Apple® Mail application, Gmail® application, or any other known or custom email application. In an implementation, email client 236 may be configured to receive simulated phishing communications from security awareness training system 202. In an example, a user of user device 204 may be mandated to download and install email client 236 by the organization. In another example, email client 236 may be provided by the organization as default. In some examples, a user of user device 204 may select, purchase and/or download email client 236, through for example, an application distribution platform. The term "application" as used herein may refer to one or more applications, services, routines, or other executable logic or instructions.

In operation, as a part of cybersecurity awareness training, security awareness training system 202 may be configured to establish groups based on one or more criteria that are used to identify users, at a time when the groups are executed. In an example, security awareness training system 202 may establish the groups upon receiving a request from the system administrator. The system administrator may want to create a group at any time, for example before initiating a simulated phishing campaign or when a computer-based security awareness training program is being organized. In such situations, the system administrator may send a request to security awareness training system 202 for creating or establishing the group.

According to an implementation, generation module 214 may be configured to receive a request from the system administrator (or any other individual) for establishing a group configured to resolve members of the group based on a plurality of users matching one or more criteria of the group at a time of execution of the group. In response to receiving the request, generation module 214 may prompt the system administrator to provide information related to the one or more criteria based on which the group is to be established. Generation module 214 may then receive an input from the system administrator on the one or more criteria to be used as a basis for identifying the one or more users for membership of the group. Examples of the one or more criteria include, but are not limited to, user field criteria, user data criteria, phish event criteria, and training criteria. As described above, each of the one or more criteria may include a set of criterions. In examples, some of these criteria may lead to personally identifiable information (also referred to as identifying information) of the users that is protected under various data protection laws across one or more jurisdictions and/or workplace regulations to be exposed.

In some embodiments, upon receiving input from the system administrator on the one or more criteria, generation module 214 may generate a query statement in order to run a query on users to determine users that meet the one or more criteria so that they are added or included to the group or members in the group is "resolved" to identify the users of group at the time or instance of running the query. Resolving members of the group includes identifying the users who match the criteria of the query at the time of the query executed by the group generator (e.g., generation module). In an example, when the query is run, the query statement is an expression of search bounds. The query statement may be generated using criterion options. In an example, criterion options may be combined using Boolean expressions to generate the query statement. Examples of criterion options associated with a user include a first name, a last name, a location, manager or subordinate's identity, email aliases, a job title, a division/department, an industry, a phone number, a phish prone percentage, a risk score, a language, a name of the organization, and any other information related to the user or attribute of the user. In an example, a query statement may be generated using condition, comparison, values, count, time frame, and event criterion options, in examples in combination with one of user field and/or phish event criterion options. In an example, the criterion options may be classified in one of a plurality of protected criteria classes, and therefore, the criterion options may or may not comply with government regulations and/or company policies. For example, the 'location" user field criterion option with a value "Brazil" may be classified in protected criteria class B.

In an example, user field criterion options may include any attribute related to a user such as a name, a location, a phish prone percentage, or any other metadata. The condition criterion option may include an inclusive condition or an exclusive condition, such as "must" or "must not". In an example, the comparison criterion option may include following options: equal, contains, does not contain, starts with, ends with, greater than, or less than. The value criterion option may include a specific value to a criterion. In an example, for criterion "name", the value may be "Charles" and for criterion "location", the value may be "southwest". In another example, for criterion "phish prone percentage", the value may be "20". Further, the time frame criterion option may include a time range, a start time, an end time, an earliest time, or a latest time that is part of the criteria being queried. In an example, an event criterion option may include any events in connection with users associated with simulated phishing campaigns, remedial trainings, and other training campaigns. In an example, an event may be any type of activity, interaction, behavior, notification, alert or communication that may occur by or in association with a user and/or a simulated phishing campaign and/or a training campaign. For example, an event may be a user clicking on an email or opening an attachment, a user receiving or opening an email, user training or assessments, a user passing or failing a simulated phishing attack, or a last date when a user logged in to security awareness training system 202. The count criterion option may include a number of times an event happens or does not happen. According to an example, the query statement generated by generation module 214 may include "The first name must not contain Charles". In another example, the query statement may include "The phish prone percentage must be greater than 50". In yet another example, the query statement may include "User must not have had enabled a macro more than 1 time." In an implementation, when more than one criteria are provided by the system administrator, generation module 214 may combine the criteria using logical operators, such as "AND", "OR", and "NOT". In an example, the criteria provided by the system administrator may include "users who have not been trained" AND "users who have been phished in the past X months". Further, the criteria are search bounds that determine the results of the query. As may be understood, query statements are built from one or more criteria and applied to user data.

According to an embodiment, generation module 214 may run a query using the query statement for users that meet the one or more criteria of the group provided by the system administrator. In an implementation, generation module 214 may run the query against user data storage 220 which includes attributes and information about the users. In an example, when the query is run, a plurality of users is returned who fit or meet the one or more criteria of the group. Thus, as a result of the query, generation module 214 may identify the plurality of users meeting or matching the one or more criteria of the group. Generation module 214 may then establish the group by adding the plurality of users to the group, or by overwriting (replacing) the group membership with the plurality of users meeting or matching the one or more criteria of the group, or by keeping as users of the group the users that were already members of the group that also meet or match the one or more criteria of the group. In an example, generation module 214 may automatically add the plurality of users to the group upon detecting an event in connection with the plurality of users. In an example, generation module 214 may resolve user A, user B, and user C as members of a group, including them in the group because the users match the one or more criteria of the group. Any members previously matching the criteria but no longer matching the criteria are removed from the group. For example, user B ceases to match the one or more criteria of the group when the group is executed, and at that point, generation module 214 resolves only user A and user C as members of the group. As such, membership in the group is dynamically determined or resolved (e.g., users of the groups identified) at time of the query or execution of the group. In an example, once the plurality of users is identified by the query and added to the group, the plurality of users that are in the group may be enrolled in a campaign (for example, a simulated phishing campaign). In an implementation, security awareness training system 202 may carry out the campaign, and when the campaign is completed, the plurality of users may be automatically added one or more other groups based on their actions. In an example, the query may be run again to identify more users on which to run the campaign. Further, security awareness training system 202 may track remedial training completed by a user, and responsive to the completion of remediation training, the user may be added to another group and/or the user may be removed from an existing group.

Although, it has been described that generation module 214 establishes the group based on receiving the input from the system administrator on the one or more criteria, in some embodiments, generation module 214 may automatically identify the one or more criteria for establishing the group, for example, using AI and/or ML techniques.

In an example, a group may be established having as criteria users from an accounting department of the organization, such that security awareness training system 202 may send a simulated phishing campaign (named "First Campaign") to the users in the accounting department. Once the criteria of the group is established and the group has been executed, security awareness training system 202 may send the "First Campaign" to all users in the group. Thereafter, a new group may be established with criteria "users who have failed "First Campaign", to be used to provide remedial training to users who failed the "First Campaign". Users who got phished with the "First Campaign" (e.g., users that failed one or more aspect of the simulated phishing campaign) would be added to the new group when the group is executed. Further, the users of the new group may be removed from the new group and added to another group upon completion of remedial training by the user, at the next time the group is executed.

According to an implementation, after the group is established, generation module 214 may perform a query, which is also referred to as "executing the group". In one example, if the group is going to be used for a simulated phishing campaign, the query is run at the time when security awareness training system 202 needs to perform an action on the users, such as, send the users a simulated phishing communication. In some examples, the query is run at a predetermined time. For example, the query may be run at a fixed point in time relative to the start of a simulated phishing campaign. In some examples, the group may be executed periodically. In some embodiments, security awareness training system 202 may associate users with the group until such time as the query is run again. In some embodiments, security awareness training system 202 may associate users with the group until the group is used for the function which triggered the generation module 214 to run the query. For example, if the query was triggered due to a request to run a simulated phishing campaign, the users that are identified as a result of the query are associated as members of the group that will be sent the simulated phishing campaign until after the simulated phishing campaign has been completed. In some embodiments, security awareness training system 202 may associate the users with the group for a period of time. In some embodiments, security awareness training system 202 may associate the users with the group until another query is run by security awareness training system 202, for example a query for which a user meets the criteria of the query.

In some embodiments, determination module 216 may determine that at least one criteria of the one or more criteria of the group has been configured as a protected criteria class of a plurality of protected criteria classes. In an example, each of the plurality of protected criteria classes may specify if information of users is to be obfuscated for display and how much of the information of the users is to be obfuscated for display. As described earlier, the plurality of protected criteria classes may include Criteria Class A, Criteria Class B, Criteria Class C, and Criteria Class D. The Criteria Class D may further include Criteria Class D1 and Criteria Class D2. In an implementation, determination module 216 may determine whether the at least one criteria of the one or more criteria of the group has been configured as part of a protected criteria class based on the one or more privacy rules stored in privacy rules storage 222. In an implementation, determination module 216 may determine whether the criteria in the query statement, or the user data that resulted from the criteria or the query statement, or any combination of these require that some or all of the results are protected.

In an implementation, determination module 216 may be configured to receive an indication to configure or mark the at least one criteria of the one or more criteria of the group as protected. In an example, determination module 216 may receive inputs for example, from the system administrator or from individual users, regarding the at least one criteria being configured as a protected criteria class. In some embodiments, determination module 216 may be configured to prompt the system administrator with a suggestion of the at least one criteria being configured as a protected criteria class. In some implementations, determination module 216 may use AI and/or ML techniques to determine that the at least one criteria has been configured or should be configured as a protected criteria class.

According to an embodiment, responsive to the determination that at least one criteria of the one or more criteria of the group has been configured as a protected criteria class of the plurality of protected criteria classes, determination module 216 may identify the group as a secured group. In some implementations, determination module 216 may be configured to receive an indication from the system administrator to make the group a secured group.

In an embodiment, decision module 218 may execute the group to identify one or more users of the plurality of users as members of the group based at least on the one or more users matching the at least one criteria of the secured group at the time of execution of the group. Upon identification of the one or more users, decision module 218 may obfuscate information of the one or more users resulting from the execution of the secured group for display, in accordance with the one or more protected criteria classes of the at least one criteria of the secured group. In an implementation, decision module 218 may be configured to obfuscate some or all identifying information of the one or more users of the secured group. In some implementations, decision module 218 may be configured to obfuscate metadata of the one or more users. In an implementation, decision module 218 may use AI and/or ML techniques to determine how much information of the one or more users is to be obfuscated.

According to an embodiment, decision module 218 may query and assess user data storage 220 to determine if information of a user should be obfuscated in case the query statement returns the user. For example, if the user is a Chief Financial Officer (CFO) in the organization, and there is a government regulation that information of a CFO of an organization is to be considered protected, then in some embodiments, a query statement crafted to query users with the title CFO or a query statement that returns the user who is currently the CFO of the organization will display obfuscated data about the user. Further, for a query statement "The first name must not contain Charles", any user who does not have "Charles" in any part of the first name field of his or her metadata will be displayed in a group (or a smart group) and a secured group will display all users who do not have "Charles" in any part of the first name field of their metadata, only if this criterion is determined not to be protected.

In an implementation, decision module 218 may determine that a combination of the criteria forming a query statement for the secured group require at least a portion of data from results of the query are to be protected or obfuscated for display. In an example, decision module 218 may obfuscate the users and their metadata in line with the query statement. The query statement may consider one or more privacy rules stored in privacy rules storage 222. As described earlier, the one or more privacy rules may be defined based on company policies, government regulations, and/or preferences of the system administrator. As may be understood, the query statement includes the criteria configured as a protected criteria class. In some implementations, decision module 218 may be configured to determine that at least a portion of user data resulting from a query of a secured group are to be protected or obfuscated for display.

An example of a generalized Boolean expression that may be used to evaluate a query statement including criteria configured as a protected criteria class of the plurality of protected criteria classes is provided below. The users for which decision module 218 obfuscates some or all of the user data of may be determined in some examples as follows.

Let the $Y^{th}$ user in the organization be represented by $U_Y$.
Let the total number of users U in the organization be N.
Therefore, all the users can be represented by $U_1 \ldots U_N$.
Let the $X^{th}$ criterion be represented by $C_X$.
Let the total number of criterion=M. Therefore, all criterion can be represented by $C_1 \ldots C_M$.
The protected criteria classes are as follows:
Criteria Class A—Criteria that do not create a privacy rule violation. In other words, any users can be personally identified with the criteria and there is no problem with revealing the identity of the user.
Criteria Class B—Criteria that create a privacy rule violation no matter what. In other words, every user that the criteria may potentially identify must have their personal identity protected to be compliant with privacy rules.
Criteria Class C—Criteria that create a privacy rule violation in combination with other criteria, and the knowledge of which users can't be shown, and which ones can be known from the outset. The group of users that criterion X creates no issue for (i.e., their information can be shown in the output) is $C_X\_ACK$.
Criteria Class D—Criteria for which the obfuscation decision is dependent on the outcome of the query. In other words, criteria that examines the user data from the users returned to look for compliance with privacy rules.

Criteria Class D1—Each user can have one or more criteria for which, if the user meets the criterion, the user's information must be hidden. If the identifier for the criterion is X, where $1<X<=M$, then if criterion X when run on the entire user population U yields User Y ($C_X(U)=U_Y$), where $1<Y<N$, then User Y's data must be obfuscated.

Criteria Class D2—Each user can have one or more criterion for which, if that specific user meets the criterion, the information of all users who meet the criterion must be obfuscated.

Let the group of users displayed (not obfuscated) be represented by V.
Let the group of users that are fully or partially obfuscated for display be represented by O.
Then:
Initialization→V=U (all users are allowed)
Initialization→For i=1 . . . M, $Results_M=0$ (For each criterion initialize "Results" to 0)
For i=1 . . . M, $Toggle_M=1$ (For each criterion initialize "Toggle" to 1)
Function Definition: $C_A(U_B)$ means user B is run through criterion A. If user B meets criterion A, then $C_A(U_B)=U_B$, otherwise if user B does not meet criterion A, $C_A(U_B)=0$
To determine which users to obfuscate—

```
FOR A = 1...M ← (For each of the criterion, the users need to pass
through this loop)
  IF (C_A is a member of Criteria Class B) ← (If a criterion is a
  member of Criteria Class B, all user data must be obfuscated)
    V = 0 ← (users to be displayed is NULL, regardless of any
    other criterion)
    GO TO END FOR ← (exit loop)
  IF (C_A is a member of Criteria Class C) ← (If a criterion is a
  member of Criteria Class C, some user data may be obfuscated and
  some not)
    V = V AND C_A_ACK ← (The group of users displayed is the
    lesser of the currently known display group and the users for
    which criterion A allows some or all of their user data to be
    shown)
  IF (C_A is a member of Criteria Class D1), then ← (If a criterion is a
  member of Criteria Class D1 only obfuscate user data of the users
  that meet the criterion)
    FOR B = 1....N ← (For each of the users)
      Results_A = Results_A + C_A(UB) ← (run each user through
      the current criterion, if the user meets the current
      criterion the user's identifier is added to the "Results"
      for the criterion. These users will not be displayed)
    END FOR
    V = V - (Results_A) ← (The users that will not be displayed are
    removed from the group of users to be displayed)
  IF (C_A is a member of Criteria Class D2), then ← (If a criterion is a
  member of Criteria Class D2, then if at least one user meets the
  criterion then the user data for all users that meet the criterion are
  not displayed)
    FOR B = 1....N ← (For each of the users)
      IF C_A(U_B) = U_B ← (run each user through the current
      criterion, if the user meets the criterion, then the flag for
      that user is set to 0. All flags are initialized to 1)
        ToggleB = 0
        Toggle_M = Toggle_M AND Toggle_B ← (AND
        together all of the flags, such that if even one
        user's flag is zero, the composite flag is zero.)
    END FOR
    V = V AND Toggle_M ← (If the criterion is a member of D2
    and at least one user meetings the criterion, then the group of
    users to be displayed is null)
END FOR
O = NOT (V) ← (The users to be obfuscated are those that are not
displayed)
```

In an example, decision module 218 may completely obfuscate the user data. In some examples, decision module 218 may partially obfuscate the user data. Further, in some examples, decision module 218 may display only a number of users in the secured group. In some examples, decision module 218 may display an equivalency of the number of users in a secured group (for example, less than 10 users, or more than 50% of all users, or 1 out of 3 users). In some examples, decision module 218 may display a percentage of users in the organization that are in the secured group. In an example, decision module 218 may display only a subset of users. In some examples, decision module 218 may not display any information about the users or how many users are in the secured group. In an example, decision module 218 may display only partial information about individual users. Accordingly, different amounts of user data are visible. According to an embodiment, if the protected criteria class is removed from the query, the system administrator may be able to see the users and their associated information again.

FIG. 3 depicts an exemplary graphical user interface 300 that a system administrator sees after querying users in a secured group, according to some embodiments.

As can be seen in FIG. 3, the secured group is established based on training criteria "Users must not have completed in Compliance Series: PCI DSS for Merchants" and user field criteria "The group name must be equal to management". In an example, the criteria of the secured group may be configured as a protected criteria class "Criteria Class A". The Criteria Class A may be a criteria that do not create a privacy rule violation. Accordingly, users associated with the Criteria Class A can be personally identified and information about the users can be displayed to the system administrator, and therefore to other people. Thus, when the system administrator queries the users in the secured group, none of the user data is obfuscated, and all of the user data is visible, along with the exact number of users in the secured group. As can be seen in FIG. 3, when the system administrator queries the users in the secured group, the system administrator can view a total number of users i.e., 541 users in the secured group, represented by "302". The system administrator can also view user data 304. These are the group of users who meet the criteria "Users must not have completed in Compliance Series: PCI DSS for Merchants" and user field criteria "The group name must be equal to management".

FIG. 4 depicts an exemplary graphical user interface 400 that the system administrator sees after querying users in a secured group, according to some embodiments.

As can be seen in FIG. 4, the secured group is established based on user field criteria "The first name must be equal to Chris" and phish event criteria "User must have clicked on a phishing email once in the last 6 months". In an example, the criteria of the secured group may be configured as a protected criteria class "Criteria Class B". The Criteria Class B may be a criteria that always create a privacy rule violation. For example, each user associated with the Criteria Class B must have his or her personal identity protected to be compliant with privacy rules. In other words, information about the users associated with the Criteria Class B must always be obfuscated. Thus, when the system administrator queries the users in the secured group, all of the user data is obfuscated, and none of the user data is visible, including a number of users in the secured group. For example, when the system administrator queries about the users in the secured group, "0 users" (represented by "402") is displayed to the system administrator. As shown in FIG. 4, a message "No users matched your search criteria" is shown to the system administrator, represented by "404". In some embodiments, the system administrator could be informed that there are one or more users that met the criteria of the secured group, however the details of the results of the query are protected and cannot be shown.

FIG. 5 depicts a flowchart 500 for using secured groups for simulated phishing campaigns to obfuscate user data for levels of privacy based on protected criteria classes, according to some embodiments.

Step 502 includes establishing a group configured to resolve members of the group based on a plurality of users matching one or more criteria of the group at a time of execution of the group. Examples of the one or more criteria include, but are not limited to, user field criteria, user date criteria, phish event criteria, and training criteria. In an implementation, generation module 214 may establish the group configured to resolve members of the group based on the plurality of users matching one or more criteria of the group at the time of execution of the group.

Step 504 includes determining that at least one criteria of the one or more criteria of the group has been configured as a protected criteria class of a plurality of protected criteria classes. In an example, each of the plurality of protected criteria classes may specify if information of users is to be obfuscated for display and how much of the information of the users is to be obfuscated for display. In an example, the plurality of protected criteria classes may include Criteria Class A, Criteria Class B, Criteria Class C, and Criteria Class D. The Criteria Class D may further include Criteria Class D1 and Criteria Class D2. In an example, at least one protected criteria class of the plurality of protected criteria classes is dependent on an outcome of a query of the plurality of users matching the criteria of a secured group. Further, in an example, at least one protected criteria class of the plurality of protected criteria classes specifies that if a specified user meets the criteria then all of the users meeting the criteria are to have at least a portion of their information obfuscated for display. Also, in an example, at least one protected criteria class of the plurality of protected criteria classes specifies that only the users meeting the criteria are to have their information obfuscated for display. In an implementation, determination module 216 may determine that at least one criteria of the one or more criteria of the group has been configured as the protected criteria class of the plurality of protected criteria classes. According to an implementation, determination module 216 may receive an indication to mark the at least one criteria as protected.

Step 506 includes identifying, responsive to the determination, the group as a secured group. In an implementation, determination module 216 may identify the group as a secured group in response to the determination that the at least one criteria of the one or more criteria of the group has been configured as the protected criteria class of the plurality of protected criteria classes. In some implementations, determination module 216 may determine that a combination of the criteria forming a query statement for the secured group require at least a portion of data from results of the query are to be protected or obfuscated for display. Further, determination module 216 may determine that at least a portion of user data resulting from a query of the secured group are to be protected or obfuscated for display.

Step 508 includes executing the group to identify one or more users of the plurality of users as members of the group based at least on the one or more users matching the at least one criteria of the secured group at the time of execution of the group. In an implementation, decision module 218 may execute the group to identify the one or more users of the plurality of users as members of the group based at least on the one or more users matching the at least one criteria of the secured group at the time of execution of the group.

Step 510 includes obfuscating for display, information of the one or more users resulting from the execution of the secured group in accordance with the protected criteria class. In an example, identifying information of the one or more users meeting the criteria of the protected criteria class of the secured group at the time of execution of the secured group may be obfuscated. In some example, metadata of the one or more users meeting the criteria of the protected criteria class of the secured group at the time of execution of the secured group may be obfuscated. According to an implementation, decision module 218 may obfuscate for display, information of the one or more users resulting from the execution of the secured group in accordance with the protected criteria class.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
   executing, by one or more servers, a query based on one or more criteria of a group;
   identifying, by the one or more servers, one or more users resulting from execution of the query;
   determining, by the one or more servers responsive to identifying the one or more users, that a portion of user data of the one or more users is protected based at least on a combination of the one or more users meeting the one or more criteria and the portion of user data of the one or more users being protected; and
   obfuscating for display, by the one or more servers responsive to the determination, at least the portion of the user data of the one or more users.

2. The method of claim 1, further comprising identifying, by the one or more servers, that the portion of user data of the one or more users resulting from the query using the one or more criteria of the group is protected.

3. The method of claim 1, further comprising establishing, by the one or more servers, the group configured to identify members of the group based on one or more users of a plurality of users meeting the one or more criteria of the group at a time of execution of the group.

4. The method of claim 1, further comprising identifying, by the one or more servers, the one or more criteria as belonging to one of a plurality of protected criteria classes.

5. The method of claim 4, further comprising using, by the one or more servers, machine learning to identify the one or more criteria as belonging to one of a plurality of protected criteria classes.

6. The method of claim 4, wherein each of the plurality of protected criteria classes specifies how much of the portion of user data of the one or more users to obfuscate for display.

7. The method of claim 1, further comprising executing, by the one or more servers, the query to identify one or more users of the plurality of users as members of the group based at least on the one or more users meeting the criteria of the group at the time of execution of the group.

8. The method of claim 1, further comprising obfuscating, by the one or more servers, at least the portion of the user data of the one or more users in accordance with a protected criteria class of the criteria.

9. The method of claim 1, further comprising obfuscating, by the one or more servers, at least the portion of the user data of the one or more users comprising metadata.

10. The method of claim 1, wherein a statement of the query is based on one or more privacy rules.

11. A system comprising:
    one or more processors coupled to memory of a server configured to:
    execute a query based on one or more criteria of a group;
    identify one or more users from results of execution of the query;
    determine, responsive to identifying the one or more users, that the a portion of user data of the one or more users is protected based at least on a combination of the one or more users meeting the one or more criteria and the portion of user data of the one or more users being protected; and
    obfuscate for display, responsive to the determination, at least the portion of the user data of the one or more users.

12. The system of claim 11, wherein the one or more processors are further configured to identify that the portion of user data of the one or more users resulting from the query using the one or more criteria of the group is protected.

13. The system of claim 11, wherein the one or more processors are further configured to establish the group configured to identify members of the group based on one or more users of a plurality of users meeting one or more criteria of the group at a time of execution of the group.

14. The system of claim 11, wherein the one or more processors are further configured to identify the one or more criteria as belonging to one of a plurality of protected criteria classes.

15. The system of claim 14, wherein the one or more processors are further configured to use machine learning to identify the one or more criteria as belonging to one of a plurality of protected criteria classes.

16. The system of claim 14, wherein each of the plurality of protected criteria classes specifies how much of the portion of user data of the one or more users to obfuscate for display.

17. The system of claim 11, wherein the one or more processors are further configured to execute the query to identify one or more users of the plurality of users as members of the group based at least on the one or more users meeting the criteria of the group at the time of execution of the group.

18. The system of claim 11, wherein the one or more processors are further configured to obfuscate at least the portion of the user data of the one or more users in accordance with a protected criteria class of the criteria.

19. The system of claim 11, wherein the one or more processors are further configured to obfuscate at least the portion of the user data of the one or more users comprising metadata.

20. The system of claim 11, wherein a statement of the query is based on one or more privacy rules.

* * * * *